US006996131B1

(12) United States Patent
Islam et al.

(10) Patent No.: US 6,996,131 B1
(45) Date of Patent: Feb. 7, 2006

(54) METHOD AND APPARATUS FOR IMPROVING RELIABILITY OF QUICK PAGING OF WIRELESS STATIONS

(75) Inventors: Khaledul Islam, Nepean (CA); Arun Munje, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/538,667

(22) Filed: Mar. 30, 2000

(51) Int. Cl.
*H04J 3/06* (2006.01)

(52) U.S. Cl. ........................................ 370/514; 370/320

(58) Field of Classification Search ................ 370/320, 370/321, 322, 318, 336, 335, 347, 349, 441, 370/442, 459
See application file for complete search history.

(56) References Cited

U.S. PATENT DOCUMENTS

| 6,111,865 A * | 8/2000 | Butler et al. ................. 370/335 |
| 6,421,540 B1 * | 7/2002 | Gilhousen et al. ........... 455/458 |
| 6,505,058 B1 * | 1/2003 | Willey ......................... 455/574 |
| 6,577,608 B1 * | 6/2003 | Moon et al. ................. 370/311 |

* cited by examiner

*Primary Examiner*—Duc Ho
*Assistant Examiner*—Thien D. Tran
(74) *Attorney, Agent, or Firm*—Mintz Levin Cohn Ferris Glovsky & Popeo

(57) ABSTRACT

Using an initial channel, it is indicated that a message is to be delivered over at least a further channel. The initial and further channels are each comprised of at least one time slot. An initial bit value is assigned to an initial portion of the time slot of the initial channel. After assigning the initial bit value, it is determined whether a corresponding portion of the further channel is available for the message. A further bit value is assigned to a further portion of the time slot of the initial channel. The further bit value is indicative of a result of the determination.

52 Claims, 2 Drawing Sheets

METHOD AND APPARATUS FOR IMPROVING RELIABILITY OF QUICK PAGING OF WIRELESS STATIONS

BACKGROUND OF THE INVENTION

The present invention is directed to wireless communication and, more particularly, to paging a mobile station.

To conserve battery power, a mobile station, such in a cellular or personal communications system (PCS) network that employs Code Division Multiple Access (CDMA), may operate in a slotted mode when not handling telephone calls and when not receiving information about the network. While operating in the slotted mode, the CDMA mobile station periodically monitors only those time slots of a paging channel (PCH) that are assigned to it to determine whether a base station is attempting to deliver an incoming call or message to it. At other times, the mobile station remains in an idle or standby state. However, the paging channel is shared by many mobile stations and carries both time slotted and non-time slotted messages. Therefore, the paging channel may carry information not intended for the mobile station in its time slot. The mobile station remains on even when the time slot does not include information directed to it because the mobile station must monitor every time slot assigned to it and may be required to monitor up two time slots in every cycle. Thus, the mobile station consumes battery power though there is no useful information in the time slot.

To further conserve power, a quick paging channel (QPCH) has been added as part of the IS-2000 wireless communication standard. The quick paging channel is used by the base station to alert an idle mobile station to activate and receive information carried by the paging channel starting from the next assigned paging channel time slot of the idle mobile station. The quick paging channel is divided into time slots which may include two indicator bits, known as paging indicator (PI) bits, that are assigned to a respective mobile station according to a hashing function used by the base station and the mobile station. The mobile station turns on at the time it is to receive its assigned PI bits. When both PI bits have been set to the value ON by the base station, the mobile station remains active to receive slotted information transmitted over the paging channel. Alternatively, when one or both of the PI bits have been set to the value OFF, the mobile station returns to its idle until the next time that it is to receive PI bits.

However, the quick paging channel PI bits assigned to a specific mobile station may precede the corresponding paging channel time slot by as much as 100 ms. This means it is possible for the base station to turn on the two PI bits assigned to a respective mobile station, to indicate the presence of a slotted message in the paging channel, and then be unable to send the message in the corresponding paging channel time slot. As an example, the base station may need to transmit a system overhead message, a general page message or other non-time slotted messages during this time slot. Alternatively, a slotted message intended for another mobile station and that began in an earlier paging channel time slot may run over into the time slot assigned to the current mobile station. As a further alternative, one or more slotted messages that were intended for a mobile station that does not support a quick paging channel may be awaiting delivery because paging channel time slots in earlier cycles that would ordinarily be assigned to the mobile station were instead used for mobile stations that were quick paged. Thus, a mobile station that detected two PI bits that were set to the value ON and activates to receive a paging channel message may fail to receive a message, thereby consuming battery power without receiving a message.

Though algorithms exist for allocating paging channel slots that may more reliably assure that a mobile station that detects two ON PI bits actually receives slotted messages on the corresponding paging channel, such algorithms are typically complex and difficult to implement in real time. It is therefore desirable that the two PI bits be assigned in a manner that more reliably indicates that a slotted message is present on the corresponding paging channel slot.

SUMMARY OF THE INVENTION

The present invention provides for reliable quick paging of a mobile station by providing a time lag between the determination of the value of the first PI bit and the determination of the value of the second PI bit and by sending subsequent "confirmation" bits. Some of the bits that are ordinarily specified as "reserved" bits in the IS-2000 standard are used as the confirmation bits. At the time each of the second PI bit and the reserved bit is sent, the base station may determine whether the corresponding paging channel slot is still available and set the value of the second PI bit and the values of the reserved bits accordingly.

In accordance with an aspect of the invention, it is indicated, using an initial channel, that a message is to be delivered over at least a further channel. The initial and further channels are each comprised of at least one time slot. An initial bit value is assigned to an initial portion of the time slot of the initial channel. After assigning the initial bit value, it is determined whether a corresponding portion of the further channel is available for the message. A further bit value is assigned to a further portion of the time slot of the initial channel. The further bit value is indicative of a result of the determination.

According to another aspect of the invention, it is indicated, using at least one quick paging channel, that a time slotted message is to be delivered over at least one paging channel. The quick paging and the paging channels are each comprised of at least one time slot. An initial PI bit value is assigned to an initial portion of the time slot of the quick paging channel. After assigning the initial PI bit value, it is determined whether a corresponding portion of the paging channel is available for the message. A further PI bit value is assigned to a further portion of the time slot of the quick paging channel. The further PI bit value is indicative of a result of the determination.

According to a further aspect of the invention, it is indicated, using at least one quick paging channel, that at least one time slotted message is to be delivered over one of a plurality of paging channels. The quick paging and paging channels are each comprised of at least one time slot. PI bit values are assigned to an initial portion of the time slot of the quick paging channel, the PI bit values being indicative of whether a corresponding portion of the one of the plurality of paging channels is available for message. After assigning the PI bit values, it is determined whether the corresponding portion of the one of the plurality of paging channels is available for the message. At least one reserved bit value is assigned to a portion at an end of the time slot of the quick paging channel, the reserved bit value being indicative of a result of the determination.

According to yet another aspect of the invention, it is indicated, using at least one of a plurality of quick paging channels, that at least one time slotted message is to be delivered over one of a plurality of paging channels. The quick paging and the paging channels are each comprised of at least one time slot. PI bit values are assigned to an initial portion of the time slot of the one of the plurality of quick paging channels. The PI bit values are indicative of whether a corresponding portion of the one of the plurality of paging channels is available for the message. After assigning the PI bit values, it is determined whether the corresponding portion of the one of the plurality of paging channels is available for the message. At least one reserved bit value is assigned to a portion at an end of the time slot of the one of the plurality of quick paging channels, the reserved bit value being indicative of a result of the determination.

According to a still further aspect of the invention, portions of a plurality of paging channels are allocated to respective ones of a plurality of quick paging channels. For each of the plurality of quick paging channels, $QPCH_q$, wherein q has a value from 1 to NUM_QPCH, NUM_QPCH is a total number of the quick paging channels and NUM_PCH is a total number of the paging channels: a first one of a respective portion of the plurality of paging channels, $PCH_{First}$, is assigned to the quick paging channel $QPCH_q$ using the following relation:

$$\text{First} = \left\lfloor (q-1) \times \frac{\text{NUM\_PCH}}{\text{NUM\_QPCH}} \right\rfloor + 1;$$

and a last one of the respective portion of the plurality of paging channels, $PCH_{Last}$, is assigned to the quick paging channel $QPCH_q$ using the following relation:

$$\text{Last} = \left\lceil q \times \frac{\text{NUM\_PCH}}{\text{NUM\_QPCH}} \right\rceil.$$

Other features and advantages of the present invention will become apparent from the following detailed description of the invention with reference to the accompanying drawings.

BRIEF DESCRIPTION OF THE DRAWINGS

The invention will now be described in greater detail in the following detailed description with reference to the drawings in which.

DETAILED DESCRIPTION OF THE INVENTION

The present invention provides a quick paging channel in which the first PI bit allocated to a respective mobile station is assigned to a location in the first half of the quick paging channel time slot and the second PI bit allocated to the mobile station is assigned to a location in the second half of the time slot. The second half of the time slot is written at later time, typically 20–40 ms, than the first half so that the values of the bits in the second half of the time slot may be assigned at a later time than those of the first half. The value of the second PI bit is not determined until near the time that the third or fourth frame is written, rather than at the same time that the value of the first PI bit is determined. Thus, the base station sends the mobile station a later and more reliable, indication that a slotted message is present in the corresponding paging channel time slot.

Further, one or more bits located at or near the end of the quick paging channel time slot, which are ordinarily defined as reserved bits whose values are set to zero in accordance with the first phase of the IS-2000 standard (protocol revision 6), may have values that are indicative of the availability of one or more paging channels that are associated with the respective quick paging channel. The bits provide a confirmation that the slotted message is present in the paging channel time slot after the rest of the quick paging channel time slot is written.

Figure 1:
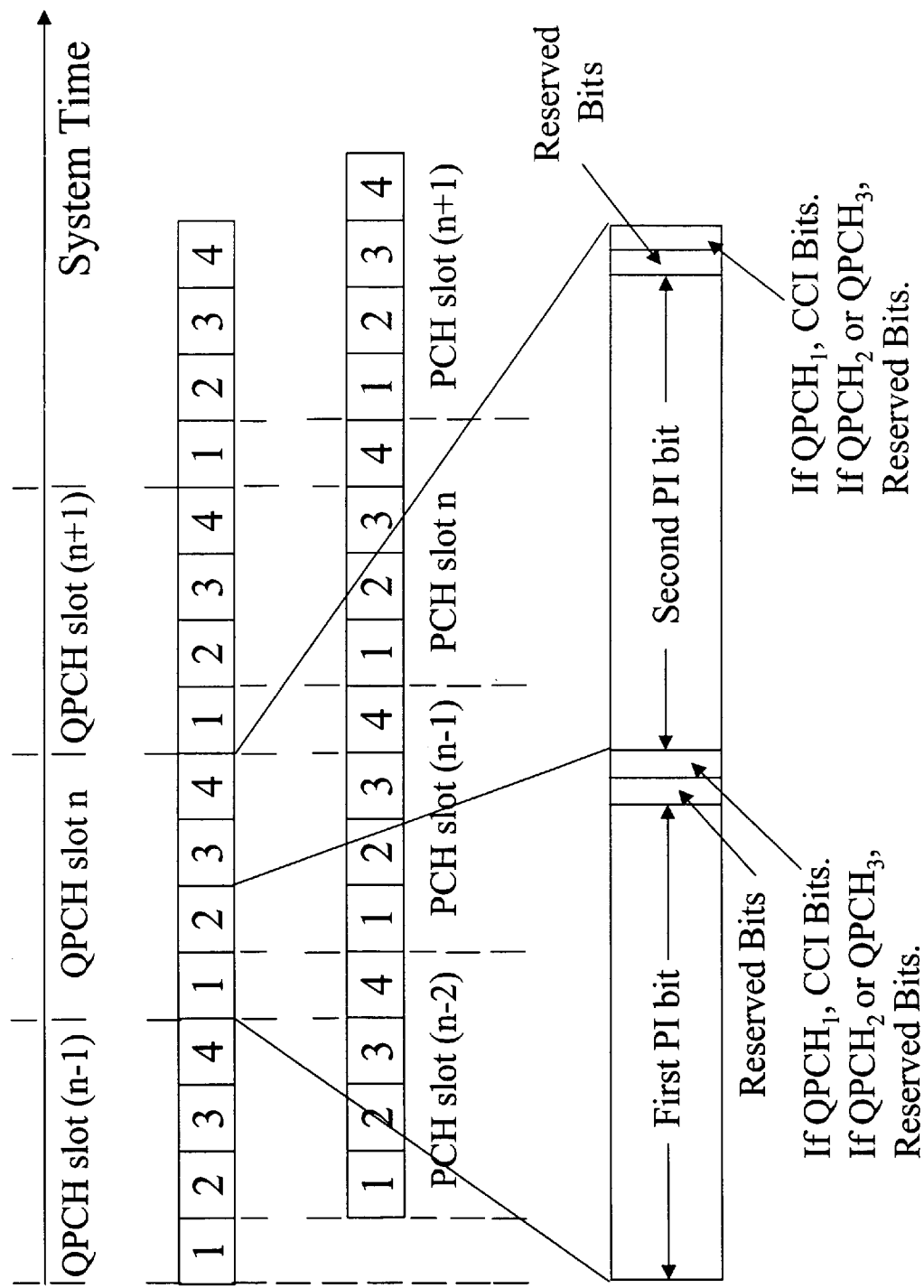
FIG. 1 is a diagram showing the relative timing of the quick paging channel and the paging channel and showing the location of the PI bits within the quick paging channel.

FIG. 1 shows the relative timing of an IS-2000 quick paging channel and an associated paging channel. Each channel is divided into a plurality of time slots, and each time slot is further divided into four frames. Additionally, up to eight reserved bits may be located after the second and fourth frames of the quick paging channel, and up to four CCI bits may be located after the reserved bits. The CCI bits are present only in the first quick paging channel. When a second and/or a third quick paging channel are used, all of the bits located after the second and fourth frames of the second and third quick paging channels are reserved bits.

The first bit of a quick paging channel time slot precedes the first bit of a corresponding paging channel time slot by a time interval of typically 100 ms, or the duration of five 20 ms frames, so that for example, there is a 20 ms interval between the end of the nth quick paging channel time slot and the first bit of the nth paging channel time slot.

According to the IS-2000 standard, the first PI bit may be located in the first frame of the time slot, and the second PI bit may be thus located in the third frame. Alternatively, the first PI bit is located in the second frame, and the second PI bit is located in the fourth frame. The locations of the PI bits within the time slot are determined by hashing functions based on information specific to the respective mobile station. Such hashing functions are defined in the IS-2000 standard. However, a preferred hashing function for determining the location of the second PI bit is described in a co-pending U.S. application Ser. No. 09/939,204, titled "An Improved Hashing Algorithm for a Quick Paging Channel" and filed by the inventors of the present application on the same day as the present application, which is incorporated herein by reference.

Figure 2:
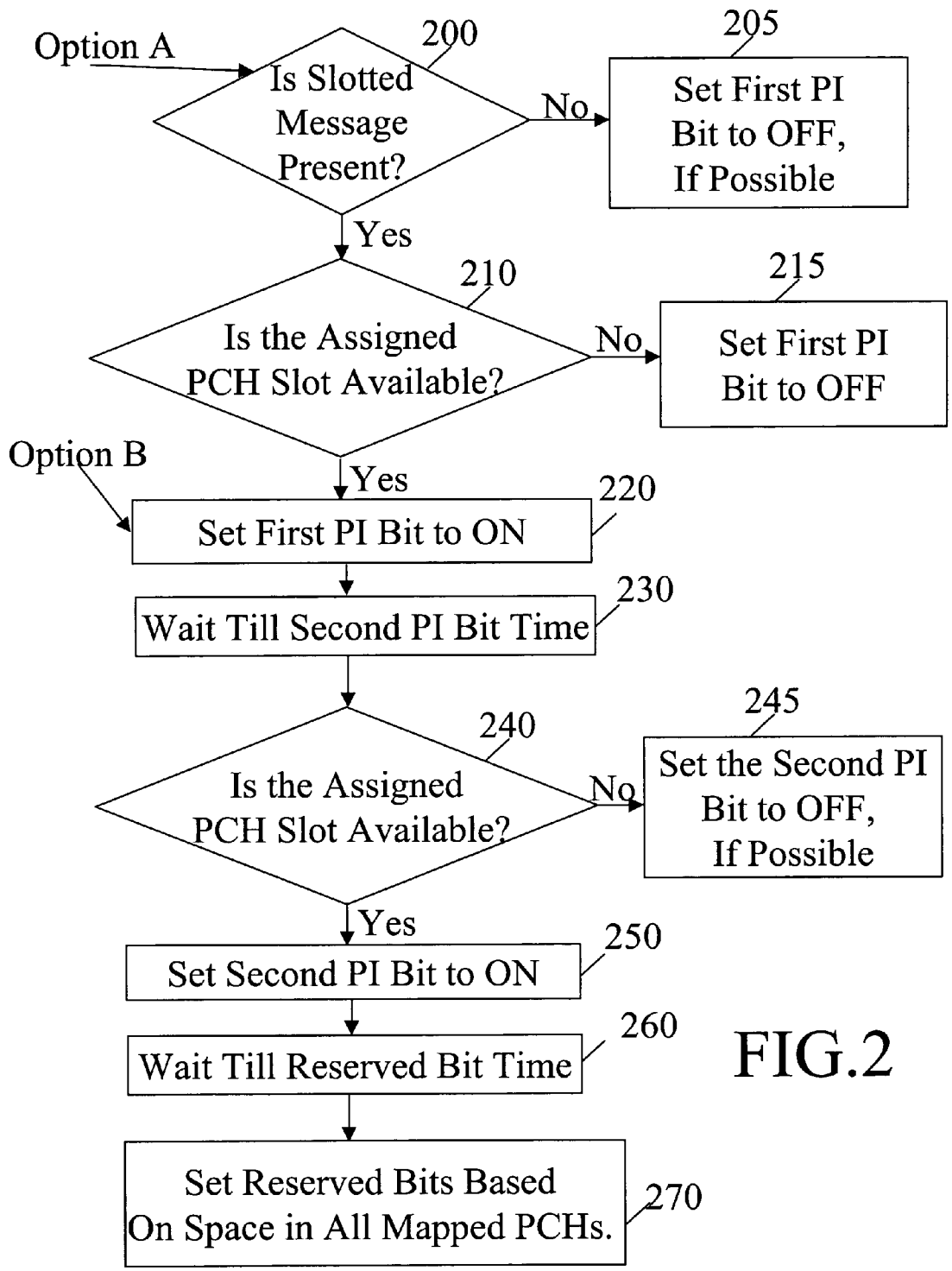
FIG. 2 is a flow chart illustrating an example of a sequence of operations for the assignment of the PI bits and reserved bits in accordance with the invention.

FIG. 2 is flow chart illustrating examples of the assignment of PI bits and reserved bits by a CDMA base station (BTS) according to the invention. The base station may be any station that communicates with CDMA mobile stations (MS) but is typically at a fixed location and is typically part of a cellular system. Further, the mobile station may be any type of subscriber station used in a cellular system and includes stations normally intended for use while in motion or during stops at an unspecified location, such as automobile or handheld cellular telephones, and includes fixed subscriber stations.

First, according to an example of the invention referred to as Option A, the base station determines in a known manner whether any slotted messages are awaiting transmission to a mobile station that supports quick paging, as step 200 shows. If no such messages are present, the mobile station sets the value of the first PI bit to the value OFF, as step 205 shows. The base station may also subsequently set the value of the second PI bit to the value OFF, though this operation is unnecessary because once the mobile station detects that the first PI bit has the value OFF, it determines that there are no slotted messages in the corresponding paging channel slot and may return to an idle state.

If slotted messages are present, the base station determines in a known manner whether the corresponding paging channel slot is available for carrying the slotted message, as step 210 shows. As an example, in FIG. 1, when the nth quick paging channel slot is assigned to the mobile station and the PI bits are located in the first and third frames of the slot, the base station may determine whether the nth paging channel slot is available while assembling the first frame of paging channel slot n-1.

When the corresponding paging channel slot is available to carry the slotted message, the base station sets the first PI bit to the value ON, as step 220 shows. When the corresponding paging channel slot is not available, the base station sets the first PI bit to the value OFF, as step 215 shows.

Alternatively, and in the example referred to as Option B, steps 200, 205, 210 and 215 are omitted. Instead, the base station always sets the first PI bit to the value ON, as step 220 shows. The base station does not determine whether any slotted messages are awaiting transmission to the mobile station, thereby reducing the time required to prepare a transmission from the base station because the determination of the presence of slotted messages is not carried out at this time. Also, any slotted messages that arrive after the first PI bit is set to the value ON, but which arrive before the value of the second PI bit is determined, may be included in the paging channel slot that corresponds to the current quick paging channel slot. Thus, these slotted messages are not delayed for inclusion in the paging channel slot that corresponds to the next assigned quick paging channel slot. However, because the mobile station has to detect the second PI bit, some battery power may be wasted because of the mobile station must wait until the second PI bit is detected.

Subsequently, for both Options A and B, the base station waits until it is at or near the time that the frame containing the second PI bit is to be written, as shown at step 230, and then again determines whether the corresponding paging channel slot is available for carrying the slotted message, as step 240 shows.

When the corresponding paging channel slot is available to carry the slotted message, the base station sets the second PI bit to the value ON, as step 250 shows. When the corresponding paging channel slot is not available, the base station sets the second PI bit to the value OFF, as step 245 shows. Thus, if the corresponding paging channel slot becomes unavailable during the 20–40 ms interval between the time that the first PI bit is set and the time that the second PI bit is set, the mobile station receives an indication accordingly from the second PI bit and does not waste battery power because it does not look for a slotted message in the corresponding paging channel slot.

After assigning ON values to the two PI bits, the base station waits until the end of or near the end of the time that the values of the bits of the final frame of the quick paging channel slot are assigned, as shown at step 260. Then, the base station may further verify that the corresponding paging channel time slot is available for carrying the slotted message and assign values to the reserved bits located after the final frame accordingly, as step 270 shows. For example, when the nth quick paging channel slot in FIG. 1 is assigned to the mobile station, the base station may determine whether the nth paging channel slot is available while assembling the final frame of the paging channel slot n-1. When the corresponding paging channel time slot is still available to carry the slotted message, the base station sets the corresponding reserved bit to the value OFF. When the corresponding paging channel slot is now unavailable, the base station sets the corresponding reserved bit to the value ON.

To generate the final frame of a quick paging channel time slot, the base station uses two frame drivers whose outputs are summed to form the final frame. Ordinarily, the value of each bit of a frame must be known at the time the frame is formed, including the value of the reserved bits. The invention, however, determines the availability of the paging channels, and thereby assigns values to the reserved bits of the final frame, at a time later than the final frame is ordinarily defined. To allow for the later definition of the reserved bits, the invention uses a first driver to first define a final frame having all reserved bits equal to zero. Thereafter, typically 18.75 msec after the first driver has defined the frame, the second driver defines a frame whose the non-reserved bits are equal to zero and whose reserved bits have value dependent upon the presence of slotted messages in the respective paging channels, as described above. The frames supplied by each of the drivers are then summed to form the final quick paging channel frame that is transmitted by the base station.

The assignment of the reserved bits and their values are determined by the number of quick paging channels used by the base station, NUM_QPCH, the number of paging channels used by the base station, NUM_PCH, and whether the messages are being transmitted at a full rate, typically 9600 bps, or at a half rate having half the number of bits in a frame as are in a full rate frame, typically 4800 bps. The IS-2000 wireless communication standard allows a base station to transmit over up to seven paging channels and over up to three quick paging channels. Ordinarily, the paging channels are not assigned to a respective quick paging channel. Instead, the quick paging channel assigned to a respective mobile station, the location of the PI bits assigned to the mobile station and the paging channel assigned to the mobile station are determined by hashing functions which base the determination on information specific to the mobile station, such as its telephone number. However, in accordance with the invention, a closed-form formula defines how each of the paging channels is assigned to a respective one of the quick paging channels. For a given mobile station, the paging channel and the associated quick paging channels, as well as the location of the PI bits assigned to the respective mobile station, are determined by hashing functions. The hashing functions are defined in the IS-2000 standard, though a preferred hashing function for determining the location of the second PI bit is disclosed in the above-mentioned co-pending U.S. application Ser. No. 09/539,204.

The paging channels are assigned to the respective quick paging channels as follows:

(1) Each of the quick paging channels ($QPCH_1, \ldots, QPCH_{NUM\_QPCH}$) is assigned a respective portion of the paging channels ($PCH_1, \ldots, PCH_{NUM\_PCH}$).

(2) The first one of the portion of paging channels, known as $PCH_{First}$, assigned to a quick paging channel $QPCH_q$, where q has a value from 1 to NUM_QPCH, is determined by the following relation:

$$\text{First} = \left\lfloor (q-1) \times \frac{\text{NUM\_PCH}}{\text{NUM\_QPCH}} \right\rfloor + 1,$$

where the floor function $y = \lfloor x \rfloor$ is defined such that y is the greatest integer having a value less than or equal to x.

(3) The last one of the portion of paging channels, known as $PCH_{Last}$, assigned to the quick paging channel $QPCH_q$ is determined by the following relation:

$$\text{Last} = \left\lceil q \times \frac{\text{NUM\_PCH}}{\text{NUM\_QPCH}} \right\rceil,$$

where the ceiling function $y = \lceil x \rceil$ is defined such that y is the smallest integer having a value greater than or equal to x.

As an example, when there are five paging channels ($PCH_1$, $PCH_2$, ..., $PCH_5$) and two quick paging channels ($QPCH_1$, $QPCH_2$), then NUM_PCH=5 and NUM_QPCH=2. Using the above two relations, the first and last paging channels assigned to each of the quick paging channels are determined. The first one of the portion of paging channels, $PCH_{First}$, assigned to the first quick paging channel $QPCH_1$ is determined from the first of the above relations, i.e. First=$\lfloor 0 \rfloor$+1=1, so that the first paging channel assigned to $QPCH_1$ is $PCH_1$. The last one of the portion of paging channels, $PCH_{Last}$, assigned to the first quick paging channel $QPCH_1$ is determined from the second one of the above relations, i.e. Last=$\lceil 2.5 \rceil$=3, so that the last paging channel assigned to $QPCH_1$ is $PCH_3$. Thus, the first, second and third paging channels are assigned to the first quick paging channel. Similarly, the first one of the portion of paging channels, $PCH_{First}$, assigned to the second quick paging channel $QPCH_2$ is determined from the first one of the above relations, i.e. First=$\lfloor 2.5 \rfloor$+1=2+1=3, so that the first paging channel assigned to $QPCH_2$ is $PCH_3$. The last one of the portion of paging channels, $PCH_{Last}$, assigned to the second quick paging channel $QPCH_2$ is determined from the second one of the above relations, i.e. Last=$\lceil 5 \rceil$=5, so that the last paging channel assigned to $QPCH_2$ is $PCH_5$. Thus, the third paging channel is divided between the two quick paging channels, and the fourth and fifth of the five paging channels are assigned solely to the second quick paging channel.

The paging channels assigned to a respective quick paging channel are represented by the reserved bits of that quick paging channel in the following manner:

(1) When only one quick paging channel is used, i.e. when NUM_QPCH=1, up to seven paging channels may be assigned to the quick paging channel. For half rate transmission, there are two reserved bits in the final frame of each time slot. The first reserved bit of the final frame is allocated to the odd-numbered paging channels, namely the first paging channel and, when present, the third, fifth and seventh paging channels. The second bit of the final frame is allocated to the even-numbered paging channels, namely the second, fourth and sixth paging channels, when one or more of these channels is present. When neither the first, third, fifth nor seventh paging channel carries a slotted message, the first reserved bit has the value ON. Alternatively, when one or more of the first, third, fifth and seventh paging channels carries slotted messages, the first reserved bit has the value OFF. Similarly, when neither the second, fourth nor sixth paging channel carries a slotted message, the second reserved bit has the value ON, and when one or more of the these paging channels carries slotted messages, the second reserved bit has the value OFF.

For full rate transmission, there are at least four reserved bits in the final frame of each time slot. The first bit of the final frame is allocated to the first paging channel and, when present, the fifth paging channel. The second bit is allocated to the second and sixth paging channels, when one or more of these channels is present. The third bit is allocated to the third and seventh paging channels, when one or more of the channels is present, and the fourth bit is allocated to fourth paging channel, when present. When neither the first nor fifth paging channel carries a slotted message, the first reserved bit has the value ON, and when one or more of these paging channels carries slotted messages, the first reserved bit has the value OFF. When neither the second nor sixth paging channel carries a slotted message, the second reserved bit has the value ON, and when one or more of the these paging channels carries slotted messages, the second reserved bit has the value OFF. When the neither the third nor seventh paging channel carries a slotted message, the third reserved bit has the value ON, and when one or more of the these paging channels carries slotted messages, the third reserved bit has the value OFF. When the fourth paging channel does not carry a slotted message, the fourth reserved bit has the value ON, and when the these paging channel carries slotted messages, the fourth reserved bit has the value OFF.

(2) When there are two or three quick paging channels, i.e. when NUM_QPCH≧2, up to four paging channels may be assigned to a respective quick paging channel. For half rate transmission, two reserved bits in the final frame of each time slot are assigned to the first quick paging channel, and four additional reserved bits are assigned to the second quick paging channel or, when a third quick paging channel is present, are divided between the second and third quick paging channels. The paging channels assigned to the first quick paging channel are represented by the reserved bits of the first quick paging channel in the manner described above. Because a total of, at most, four paging channels are assigned between the second and third quick paging channels, each of the four reserved bits assigned to these two quick paging channels is allocated to a respective paging channel in the order that the paging channels are assigned to the quick paging channels. Thus, the first of the four bits is allocated to the first paging channel that is assigned to the second quick paging channel, namely paging channel $PCH_{2,First}$. The second bit is allocated to the next paging channel that is assigned to the second quick paging channel, which may be paging channel $PCH_{2,Last}$, or when only one paging channel is assigned to the second quick paging channel, the second bit is allocated to the first paging channel that is assigned to the third quick paging channel, namely paging channel $PCH_{3,First}$. The remainder of the four bits are similarly assigned.

For full rate transmission, four reserved bits in the final frame of each time slot are assigned to the first quick paging channel, and eight additional reserved bits are assigned to the second quick paging channel or, when a third quick paging channel is present, are divided between the second and third quick paging channels. The paging channels assigned to the first quick paging channel are represented by the reserved bits of the first quick paging channel in the manner described above. Because a total of, at most, four paging channels are assigned between the second and third quick paging channels, only four of the eight reserved bits are used and each of the four bits is allocated to a respective paging channel in the order that the paging channels are assigned to the quick paging channels, as described above.

Although the present invention has been described in relation to particular embodiments thereof, many other variations and modifications and other uses may become apparent to those skilled in the art. It is preferred, therefore, that the present invention be limited not by this specific disclosure herein, but only by the appended claims.

What is claimed is:

1. A method of indicating, using an initial channel, that a message is to be delivered over at least a further channel, said initial and further channels each being comprised of at least one time slot, said method comprising the steps of:
assigning an initial bit value to an initial portion of said time slot of said initial channel;
determining, after assigning said initial bit value, whether a corresponding portion of said further channel is available for said message; and
assigning a further bit value to a further portion of said time slot of said initial channel, said further bit value being indicative of a result of said determination.

2. the method of claim 1 wherein said initial bit value always comprises an indication that said message is present.

3. The method of claim 1 further comprising the step of determining, before assigning said initial bit value, whether said corresponding portion of said further channel is available for said message; and wherein said initial bit value is indicative of a result of said determination.

4. The method of claim 1 wherein said first portion is within a first half of said time slot, and said further portion is within a second half of said time slot.

5. The method of claim 1 further comprising the steps of:
further determining, after assigning said further bit value, whether said corresponding portion of said further channel is available for said message; and
assigning a still further bit value to a portion at an end of said time slot of said initial channel, said still further bit value being indicative of a result of said further determination.

6. The method of claim 5 wherein said still further bit value indicates whether at least one of a plurality of further channels is available for said message.

7. The method of claim 1 wherein said initial channel includes at least one quick paging channel, said further channel includes at least one paging channel, said message is a time slotted message, said initial bit value comprises an initial paging indicator (PI) bit value, and said further bit value comprises a further pi bit value.

8. The method of claim 7 wherein said initial pi bit value always comprises an indication that said message is present.

9. The method of claim 7 further comprising the step of determining, before assigning said initial PI bit value, whether said corresponding portion of said paging channel is available for said message; and wherein said initial PI bit value is indicative of a result of said determination.

10. The method of claim 7 wherein said time slot is comprised of a plurality of frames, and said first portion is within a first one of said plurality of frames and said further portion is within a third one of said plurality of frames.

11. The method of claim 7 wherein said time slot is comprised of a plurality of frames, and said first portion is within a second one of said plurality of frames and said further portion is within a fourth one of said plurality of frames.

12. The method of claim 7 further comprising the steps of:
further determining, after assigning said further PI bit value, whether said corresponding portion of said paging channel is available for said message; and
assigning at least one reserved bit value to a portion at an end of said time slot of said quick paging channel, said reserved bit value being indicative of a result of said further determination.

13. A method of indicating, using at least one quick paging channel, that at least one time slotted message is to be delivered over one of a plurality of paging channels, said quick paging and said paging channels each being comprised of at least one time slot, said method comprising the steps of:
assigning paging indicator (PI) bit values to an initial portion of said time slot of said quick paging channel, said PI bit values being indicative of whether a corresponding portion of said one of said plurality of paging channels is available for said message;
determining, after assigning said PI bit values, whether said corresponding portion of said one of said plurality of paging channels is available for said message; and
assigning at least one reserved bit value to a portion at an end of said time slot of said quick paging channel, said reserved bit value being indicative of a result of said determination.

14. The method of claim 13 further comprising the steps of: assigning further PI bit values to said initial portion of said time slot of said quick paging channel, said further PI bit values being indicative of whether a corresponding portion of at least another of said plurality of paging channels is available for another slotted message; further determining, after assigning said further PI bit values, whether said corresponding portion of said at least another of said plurality of paging channels is available for said another message; wherein said reserved bit value is indicative of a result of said determination and said further determination.

15. The method of claim 13 further comprising the steps of: assigning further PI bit values to said initial portion of said time slot of said quick paging channel, said further PI bit values being indicative of whether a corresponding portion of at least another of said plurality of paging channels is available for another slotted message; further determining, after assigning said further PI bit values, whether said corresponding portion of said at least another of said plurality of paging channels is available for said another message; and further assigning at least another reserved bit value to said portion at said end of said time slot of said quick paging channel, said another reserved bit value being indicative of a result of said further determination.

16. The method of claim 13 wherein said reserved bit value is indicative of a result of said determination of at least an odd numbered one of said plurality of paging channels.

17. The method of claim 13 wherein said reserved bit value is indicative of a result of said determination of at least an even numbered one of said plurality of paging channels.

18. The method of claim 13 wherein said reserved bit value is indicative of a result of said determination of at least one of a first one and a fifth one of said plurality of paging channels.

19. The method of claim 13 wherein said reserved bit value is indicative of a result of said determination of at least one of a second one and a sixth one of said plurality of paging channels.

20. The method of claim 13 wherein said reserved bit value is indicative of a result of said determination of at least one of a third one and a seventh one of said plurality of paging channels.

21. The method of claim 13 wherein said reserved bit value is indicative of a result of said determination of a fourth one of said plurality of paging channels.

22. A method of indicating, using at least one of a plurality of quick paging channels, that at least one time slotted message is to be delivered over one of a plurality of paging channels, said quick paging and said paging channels each being comprised of at least one time slot, said method comprising the steps of:

assigning paging indicator (PI) bit values to an initial portion of said time slot of said one of said plurality of quick paging channels, said PI bit values being indicative of whether a corresponding portion of said one of said plurality of paging channels is available for said message;

determining, after assigning said PI bit values, whether said corresponding portion of said one of said plurality of paging channels is available for said message; and assigning at least one reserved bit value to a portion at an end of said time slot of said one of said plurality of quick paging channels, said reserved bit value being indicative of a result of said determination.

23. The method of claim 22 wherein each of said plurality of quick paging channels is assigned a respective portion of said plurality of paging channels.

24. The method of claim 23 wherein a first one of a respective portion of said plurality of paging channels, $PCH_{first}$, assigned to a respective one of said plurality of quick paging channels, $QPCH_q$, is determined by the following relation:

$$\text{First} = \left\lfloor (q-1) \times \frac{\text{NUM\_PCH}}{\text{NUM\_QPCH}} \right\rfloor + 1,$$

wherein q has a value from 1 to NUM_QPCH, NUM_QPCH is a total number of said quick paging channels and NUM_PCH is a total number of said paging channels.

25. The method of claim 23 wherein a last one of a respective portion of said plurality of paging channels, $PCH_{last}$, assigned to a respective one of said plurality of quick paging channels, $QPCH_q$ is determined by the following relation:

$$\text{Last} = \left\lceil q \times \frac{\text{NUM\_PCH}}{\text{NUM\_QPCH}} \right\rceil,$$

wherein q has a value from 1 to NUM_QPCH, NUM_QPCH is a total number of said quick paging channels and NUM_PCH is a total number of said paging channels.

26. A method of allocating portions of a plurality of paging channels to respective ones of a plurality of quick paging channels, said method comprising the steps of:

for each of said plurality of quick paging channels, $QPCH_q$, wherein q has a value from 1 to NUM_QPCH, NUM_QPCH is a total number of said quick paging channels and NUM_PCH is a total number of said paging channels, the steps of:

assigning a first one of a respective portion of said plurality of paging channels, $PCH_{First}$, to said quick paging channel $QPCH_q$ using the following relation:

$$\text{First} = \left\lfloor (q-1) \times \frac{\text{NUM\_PCH}}{\text{NUM\_QPCH}} \right\rfloor + 1;$$

and assigning a last one of said respective portion of said plurality of paging channels, $PCH_{Last}$, to said quick paging channel $QPCH_q$ using the following relation:

$$\text{Last} = \left\lceil q \times \frac{\text{NUM\_PCH}}{\text{NUM\_QPCH}} \right\rceil.$$

27. An apparatus for indicating, using an initial channel, that a message is to be delivered over at least a further channel, said initial and further channels each being comprised of at least one time slot, said apparatus comprising:

means for assigning an initial bit value to an initial portion of said time slot of said initial channel;

means for determining, after assigning said initial bit value, whether a corresponding portion of said further channel is available for said message; and means for assigning a further bit value to a further portion of said time slot of said initial channel, said further bit value being indicative of a result of said determination.

28. The apparatus of claim 27 wherein said initial bit value always comprises an indication that said message is present.

29. The apparatus of claim 27 further comprising means for determining, before assigning said initial bit value, whether said corresponding portion of said further channel is available for said message; and wherein said initial bit value is indicative of a result of said determination.

30. The apparatus of claim 27 wherein said first portion is within a first half of said time slot, and said further portion is within a second half of said time slot.

31. The apparatus of claim 27 further comprising:

means for further determining, after assigning said further bit value, whether said corresponding portion of said further channel is available for said message; and means for assigning a still further bit value to a portion at an end of said time slot of said initial channel, said still further bit value being indicative of a result of said further determination.

32. The apparatus of claim 31 wherein said still further bit value indicates whether at least one of a plurality of further channels is available for said message.

33. The apparatus of claim 27 wherein said initial channel includes at least one quick paging channel, said further channel includes at least one paging channel, said message is a time slotted message, said initial bit value comprises an initial paging indicator (PI) bit value, and said further bit value comprises a further PI bit value.

34. The apparatus of claim 33 wherein said initial PI bit value always comprises an indication that said message is present.

35. The apparatus of claim 33 further comprising means for determining, before assigning said initial PI bit value, whether said corresponding portion of said paging channel is available for said message; and wherein said initial PI bit value is indicative of a result of said determination.

36. The apparatus of claim 33 wherein said time slot is comprised of a plurality of frames, and said first portion is within a first one of said plurality of frames and said further portion is within a third one of said plurality of frames.

37. The apparatus of claim 33 wherein said time slot is comprised of a plurality of frames, and said first portion is within a second one of said plurality of frames and said further portion is within a fourth one of said plurality of frames.

38. The apparatus of claim 33 further comprising means for further determining, after assigning said further PI bit value, whether said corresponding portion of said paging channel is available for said message; and means for assigning at least one reserved bit value to a portion at an end of said time slot of said quick paging channel, said reserved bit value being indicative of a result of said further determination.

39. An apparatus for indicating, using at least one quick paging channel, that at least one time slotted message is to be delivered over one of a plurality of paging channels, said quick paging and said paging channels each being comprised of at least one time slot, said apparatus comprising:

means for assigning paging indicator (PI) bit values to an initial portion of said time slot of said quick paging channel, said PI bit values being indicative of whether a corresponding portion of said one of said plurality of paging channels is available for said message;

means for determining, after assigning said PI bit values, whether said corresponding portion of said one of said plurality of paging channels is available for said message; and means for assigning at least one reserved bit value to a portion at an end of said time slot of said quick paging channel, said reserved bit value being indicative of a result of said determination.

40. The apparatus of claim 39 further comprising: means for assigning further PI bit values to said initial portion of said time slot of said quick paging channel, said further PI bit values being indicative of whether a corresponding portion of at least another of said plurality of paging channels is available for another slotted message; means for further determining, after assigning said further PI bit values, whether said corresponding portion of said at least another of said plurality of paging channels is available for said another message; wherein said reserved bit value is indicative of a result of said determination and said further determination.

41. The apparatus of claim 39 further comprising: means for assigning further PI bit values to said initial portion of said time slot of said quick paging channel, said further PI bit values being indicative of whether a corresponding portion of at least another of said plurality of paging channels is available for another slotted message; means for further determining, after assigning said further PI bit values, whether said corresponding portion of said at least another of said plurality of paging channels is available for said another message; and means for further assigning at least another reserved bit value to said portion at said end of said time slot of said quick paging channel, said another reserved bit value being indicative of a result of said further determination.

42. The apparatus of claim 39 wherein said reserved bit value is indicative of a result of said determination of at least an odd numbered one of said plurality of paging channels.

43. The apparatus of claim 39 wherein said reserved bit value is indicative of a result of said determination of at least an even numbered one of said plurality of paging channels.

44. The apparatus of claim 39 wherein said reserved bit value is indicative of a result of said determination of at least one of a first one and a fifth one of said plurality of paging channels.

45. The apparatus of claim 39 wherein said reserved bit value is indicative of a result of said determination of at least one of a second one and a sixth one of said plurality of paging channels.

46. The apparatus of claim 39 wherein said reserved bit value is indicative of a result of said determination of at least one of a third one and a seventh one of said plurality of paging channels.

47. The apparatus of claim 39 wherein said reserved bit value is indicative of a result of said determination of a fourth one of said plurality of paging channels.

48. An apparatus for indicating, using at least one of a plurality of quick paging channels, that at least one time slotted message is to be delivered over one of a plurality of paging channels, said quick paging and said paging channels each being comprised of at least one time slot, said apparatus comprising:

means for assigning paging indicator (PI) bit values to an initial portion of said time slot of said one of said plurality of quick paging channels, said PI bit values being indicative of whether a corresponding portion of said one of said plurality of paging channels is available for said message;

means for determining, after assigning said PI bit values, whether said corresponding portion of said one of said plurality of paging channels is available for said message; and means for assigning at least one reserved bit value to a portion at an end of said time slot of said one of said plurality of quick paging channels, said reserved bit value being indicative of a result of said determination.

49. The apparatus of claim 48 wherein each of said plurality of quick paging channels is assigned a respective portion of said plurality of paging channels.

50. The apparatus of claim 49 wherein a first one of a respective portion of said plurality of paging channels, $PCH_{first}$, assigned to a respective one of said plurality of quick paging channels, $QPCH_q$, is determined by the following relation:

$$\text{First} = \left\lfloor (q-1) \times \frac{\text{NUM\_PCH}}{\text{NUM\_QPCH}} \right\rfloor + 1,$$

wherein q has a value from 1 to NUM_QPCH, NUM_QPCH is a total number of said quick paging channels and NUM_PCH is a total number of said paging channels.

51. The apparatus of claim 49 wherein a last one of a respective portion of said plurality of paging channels, $PCH_{last}$, assigned to a respective one of said plurality of quick paging channels, $QPCH_q$ is determined by the following relation:

$$\text{Last} = \left\lfloor q \times \frac{\text{NUM\_PCH}}{\text{NUM\_QPCH}} \right\rfloor,$$

wherein q has a value from 1 to NUM_QPCH, NUM_QPCH is a total number of said quick paging channels and NUM_PCH is a total number of said paging channels.

52. An apparatus for allocating portions of a plurality of paging channels to respective ones of a plurality of quick paging channels, said apparatus comprising:

for each of said plurality of quick paging channels, $QPCH_q$, wherein q has a value from 1 to NUM_QPCH, NUM_QPCH is a total number of said quick paging channels and NUM_PCH is a total number of said paging channels,:

means for assigning a first one of a respective portion of said plurality of paging channels, $PCH_{First}$, to said quick paging channel $QPCH_q$ using the following relation:

$$\text{First} = \left\lfloor (q-1) \times \frac{\text{NUM\_PCH}}{\text{NUM\_QPCH}} \right\rfloor + 1;$$

and means for assigning a last one of said respective portion of said plurality of paging channels, $PCH_{Last}$, to said quick paging channel $QPCH_q$ using the following relation:

$$\text{Last} = \left\lfloor q \times \frac{\text{NUM\_PCH}}{\text{NUM\_QPCH}} \right\rfloor.$$

* * * * *